US012365576B2

(12) United States Patent
Rasia

(10) Patent No.: US 12,365,576 B2
(45) Date of Patent: Jul. 22, 2025

(54) SADDLE FOR HORSE RIDING

(71) Applicant: PRESTIGE ITALIA S.P.A., Trissino (IT)

(72) Inventor: Andrea Rasia, Frazione Quargnenta (IT)

(73) Assignee: PRESTIGE ITALIA S.P.A., Trissino (IT)

( * ) Notice: Subject to any disclaimer, the term of this patent is extended or adjusted under 35 U.S.C. 154(b) by 0 days.

(21) Appl. No.: 17/907,310

(22) PCT Filed: Mar. 23, 2021

(86) PCT No.: PCT/EP2021/057434
§ 371 (c)(1),
(2) Date: Sep. 26, 2022

(87) PCT Pub. No.: WO2021/191207
PCT Pub. Date: Sep. 30, 2021

(65) Prior Publication Data

US 2023/0109440 A1 Apr. 6, 2023

(30) Foreign Application Priority Data

Mar. 24, 2020 (IT) ........................ 102020000006154
Aug. 4, 2020 (IT) ........................ 102020000019090

(51) Int. Cl.
*B68C 1/02* (2006.01)
*B68C 1/04* (2006.01)
*B68C 1/12* (2006.01)

(52) U.S. Cl.
CPC ................ *B68C 1/025* (2013.01); *B68C 1/04* (2013.01); *B68C 1/126* (2013.01); *B68C 2001/042* (2013.01)

(58) Field of Classification Search
CPC ....... B68C 2001/042; B68C 1/04; B68C 1/02; B68C 1/00
See application file for complete search history.

(56) References Cited

U.S. PATENT DOCUMENTS 2,353,622 A * 7/1944 Boyle ........................ B68C 1/04 54/44.1
3,888,070 A 6/1975 White et al.
(Continued)

FOREIGN PATENT DOCUMENTS

CN 202346755 U 7/2012
CN 102730616 A 10/2012
(Continued)

OTHER PUBLICATIONS

International Search Report issued Apr. 21, 2021 re: Application No. PCT/EP2021/057434; pp. 1-4; U.S. Pat. No. 3,888,070 A, DE 10 2004 022048 A1, US 2015/0232322 A1 and WO 2008/030103 A1.
(Continued)

*Primary Examiner* — Morgan T Jordan
*Assistant Examiner* — Shada Mohamed Alghailani
(74) *Attorney, Agent, or Firm* — CANTOR COLBURN LLP

(57) ABSTRACT

A saddle for horse riding includes a supporting frame associated with at least one covering body designed to define a seat for a user, the supporting frame having a front region, which has a pommel, and a rear region, which has a cantle. The supporting frame is provided with connecting elements configured for connection between the front region and the rear region that are adapted to allow a rotation about an oscillation axis, which in use is substantially vertical, of the rear region with respect to the front region.

7 Claims, 11 Drawing Sheets

(56) References Cited

U.S. PATENT DOCUMENTS

| | | | | |
|---|---|---|---|---|
| 4,004,402 | A * | 1/1977 | Bischeltsrieder | B68C 1/025 54/44.1 |
| 5,191,752 | A * | 3/1993 | Murphy | B68C 1/02 54/44.7 |
| 8,434,748 | B1 | 5/2013 | Pearce et al. | |
| 9,914,634 | B2 * | 3/2018 | McClellan | B68C 1/025 |
| 2005/0011167 | A1 * | 1/2005 | Belton | B68C 1/04 54/44.1 |
| 2009/0320419 | A1 * | 12/2009 | Revheim | B68C 1/04 54/44.3 |
| 2015/0232322 | A1 | 8/2015 | Aguilar | |
| 2022/0234882 | A1 * | 7/2022 | Engelke | B68C 1/025 |

FOREIGN PATENT DOCUMENTS

| | | | | |
|---|---|---|---|---|
| DE | 10306226 | A1 * | 9/2004 | B68C 1/025 |
| DE | 102004022048 | A1 | 11/2005 | |
| GB | 2444895 | A * | 6/2008 | B68C 1/04 |
| WO | 9501302 | A2 | 1/1995 | |
| WO | 2008030103 | A1 | 3/2008 | |
| WO | 2014155401 | A1 | 10/2014 | |
| WO | WO-2021094857 | A1 * | 5/2021 | B68C 1/02 |

OTHER PUBLICATIONS

Written Opinion issued Apr. 21, 2021 re: Application No. PCT/EP2021/057434; pp. 1-4; U.S. Pat. No. 3,888,070 A, DE 10 2004 022048 A1 and US 2015/0232322 A1.

Australian Office Action for Australian Application No. 2021240964, dated Oct. 17, 2023, 3 pages.

Australian Office Action for Australian Application No. 2021240964, dated Dec. 8, 2023, 3 pages.

Russian Office Action for Application No. PCT/EP2021/057434, dated May 20, 2024, 16 pages with translation.

Chinese Office Action for Application No. 202180023159.3, dated Aug. 7, 2024, 13 pages with translation.

* cited by examiner

SADDLE FOR HORSE RIDING

TECHNICAL FIELD

The present disclosure relates to a saddle for horse riding.

BACKGROUND

Saddles for horse riding are normally constituted by a core or supporting frame made of composite material, wood or tempered steel, the purpose of which is to hold the rider on a support, generally constituted by a robust skin, which extends from a pommel to a cantle.

The frame and the parts associated with it are covered by a covering, which is modeled so as to constitute the seat.

Typically, in addition to the seat, saddles are provided with cushions and with knee rolls, which are often provided with a padding the purpose of which is to support the knee of the rider.

A fairly common problem with many saddles is caused by an excessive rigidity of the frame along its direction of longitudinal extension.

This problem is particularly felt in certain situations in which there is, during use, a movement of the back of the horse that leads to a rotation of the rear part of the saddle.

In such situations, the rigidity, in the longitudinal direction, of the frame can cause a discomfort for the horse, which may be considerable.

SUMMARY

The aim of the present disclosure is to provide a saddle for horse riding which is capable of improving the known art in one or more of the abovementioned aspects.

Within this aim, the disclosure provides a saddle for horse riding that is capable of appreciably improving the comfort of use, for the rider but especially for the horse.

The disclosure provides a saddle for horse riding that is highly reliable.

This aim and these and other advantages which will become more apparent hereinafter are achieved by providing a saddle for horse riding according to the independent claim, optionally provided with one or more of the characteristics of the dependent claims.

BRIEF DESCRIPTION OF THE DRAWINGS

Further characteristics and advantages of the disclosure will become more apparent from the detailed description that follows of a preferred, but not exclusive, embodiment of the saddle for horse riding according to the disclosure, which is illustrated for the purposes of non-limiting example in the accompanying drawings wherein.

DETAILED DESCRIPTION OF THE DRAWINGS

Figures 1, 2:
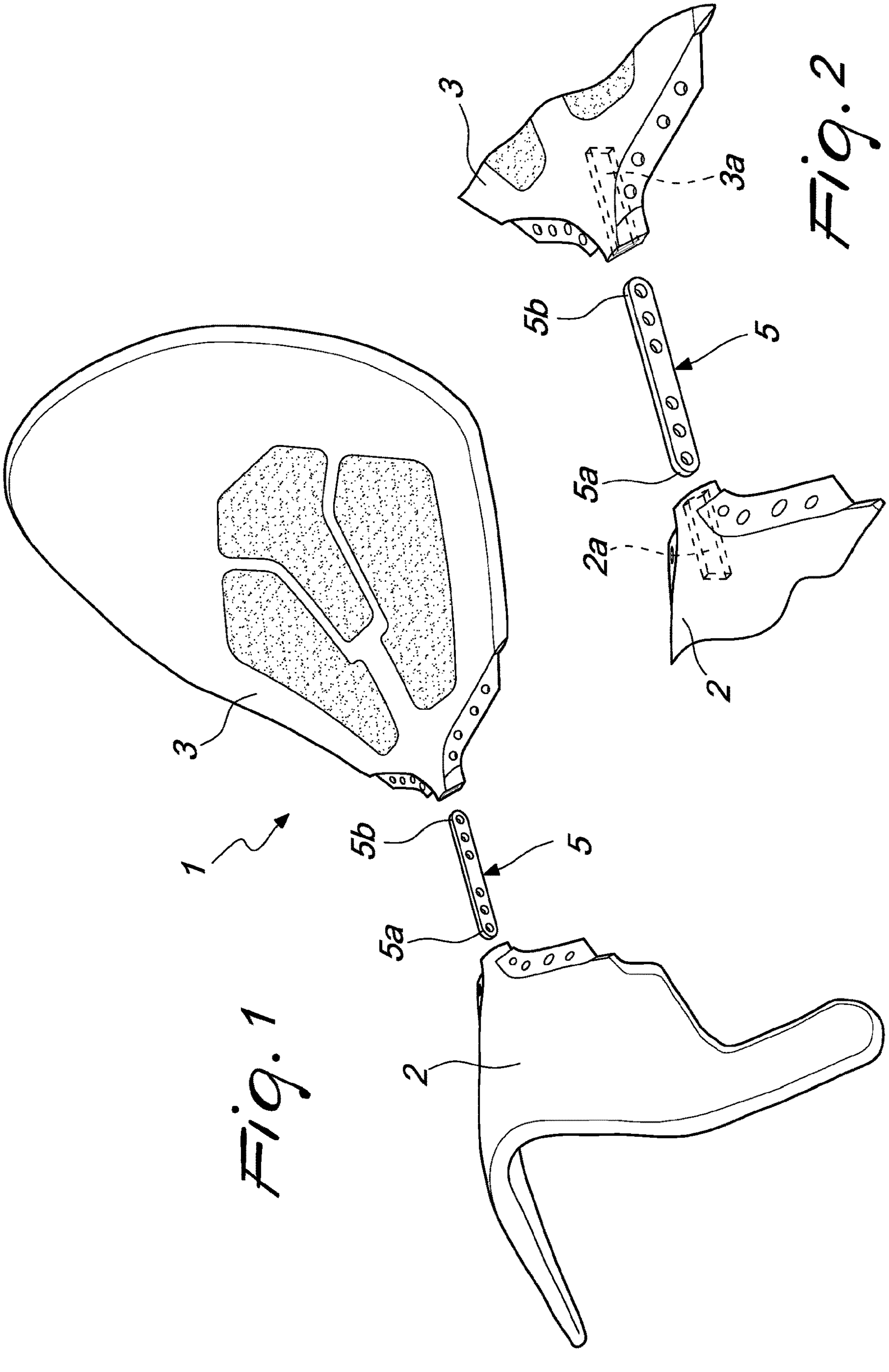
FIG. 1 is a partially exploded perspective view of a portion of the supporting frame for a saddle for horse riding according to the disclosure.
FIG. 2 is an enlargement of a region of the portion of the supporting frame of FIG. 1.
Figure 4:
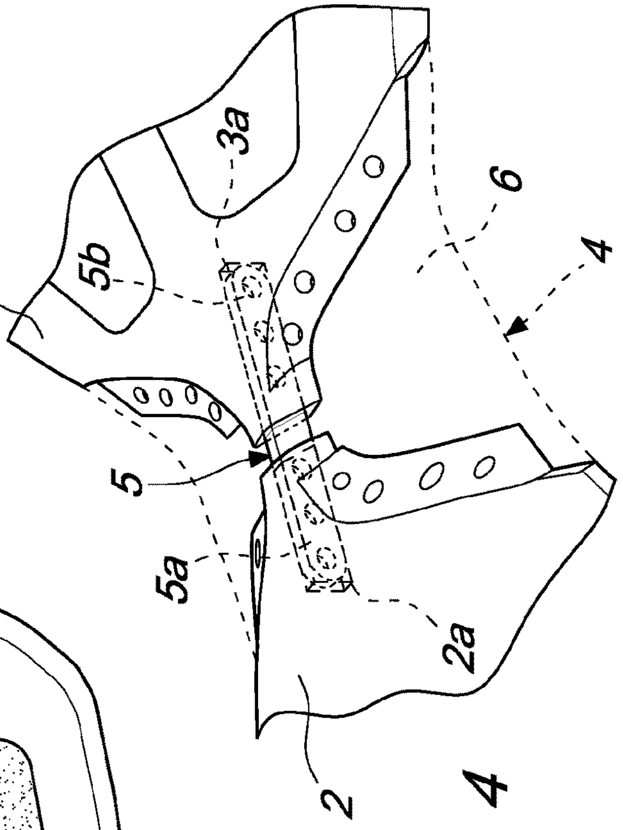
FIG. 4 is an enlargement of a region of the supporting frame of FIG. 3.
Figure 3:
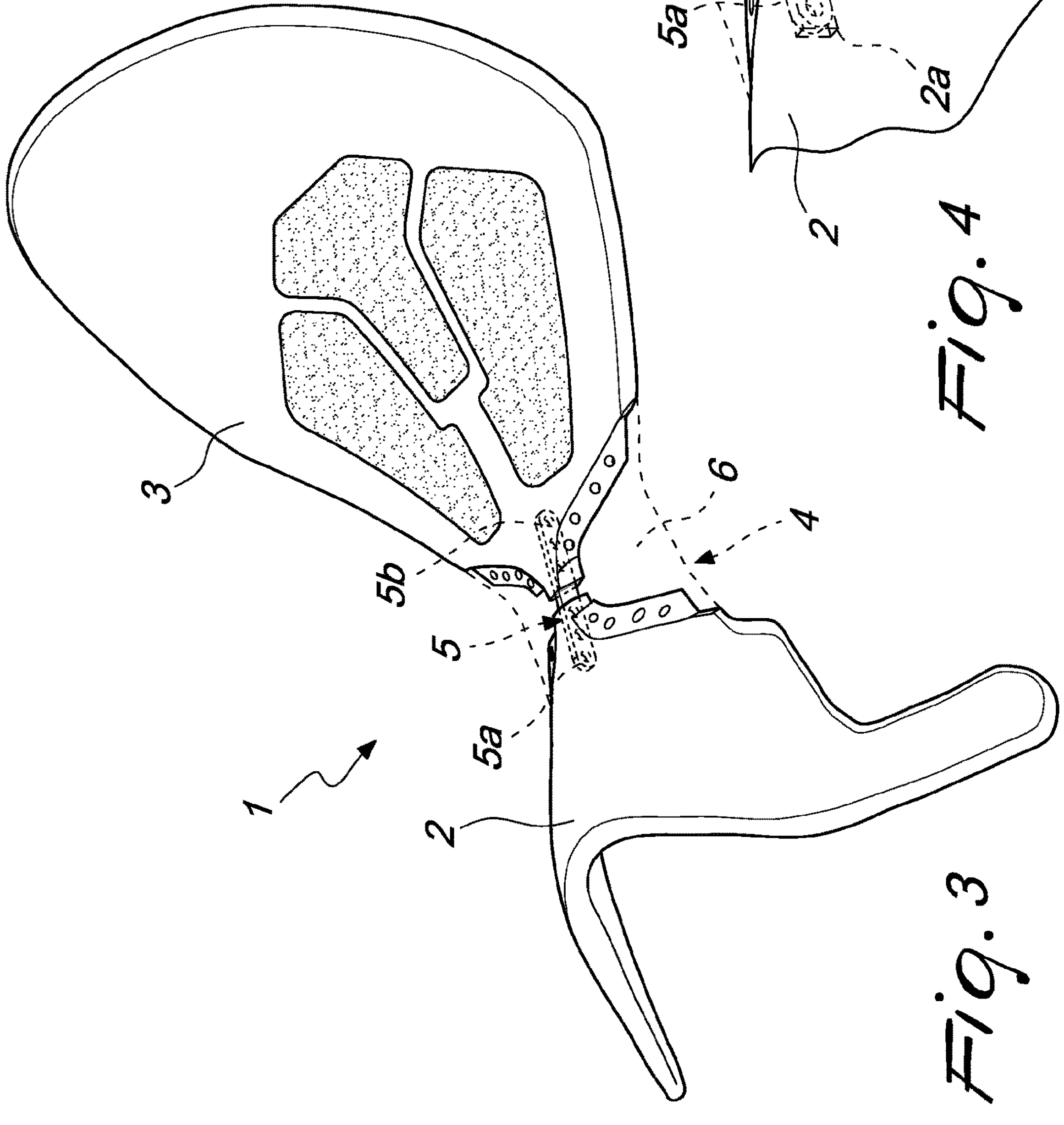
FIG. 3 is a perspective view of the supporting frame for a saddle for horse riding according to the disclosure wherein the connecting region is shown transparently.
Figure 5:
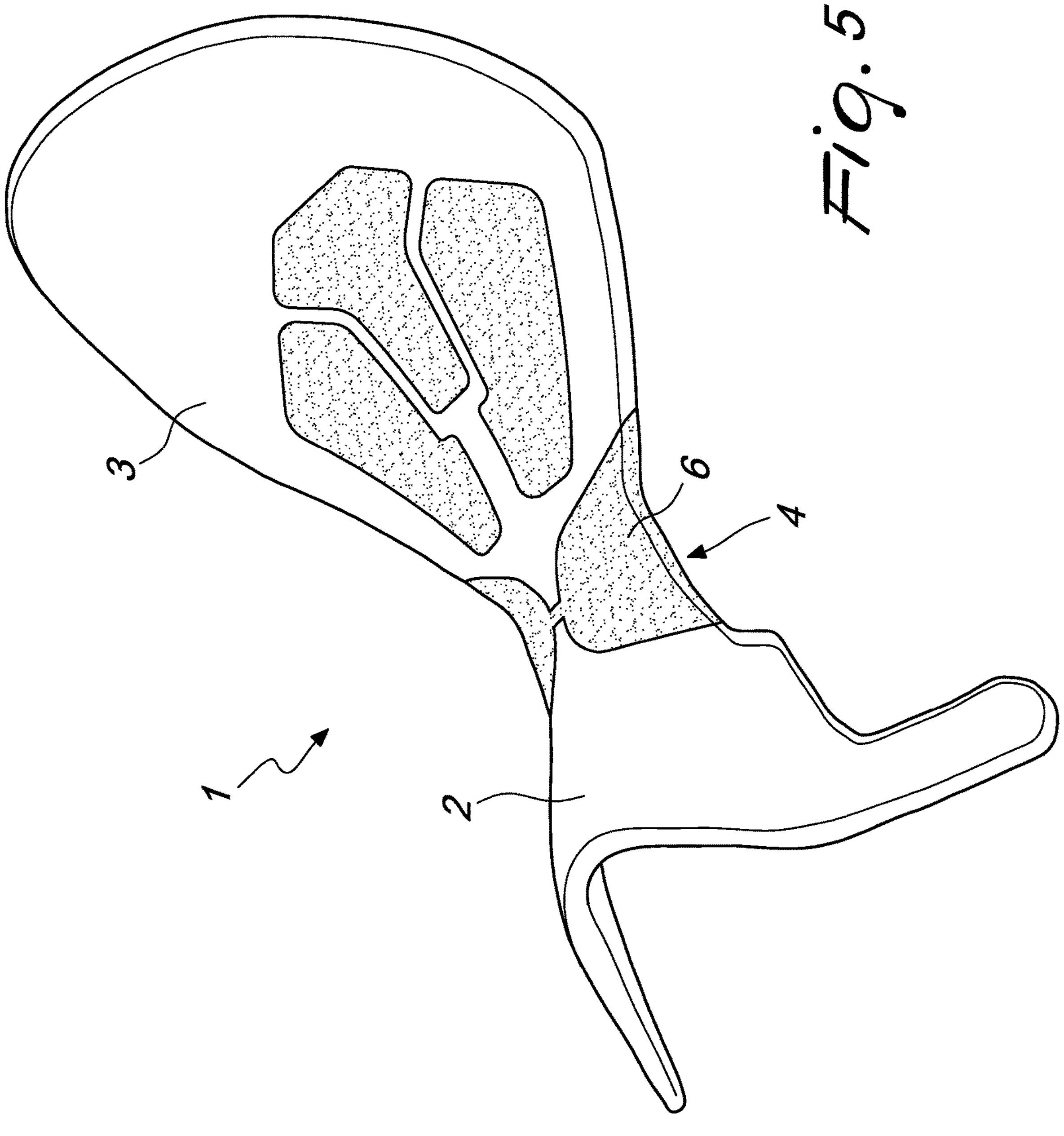
FIG. 5 is a perspective view of the supporting frame.
Figure 6:
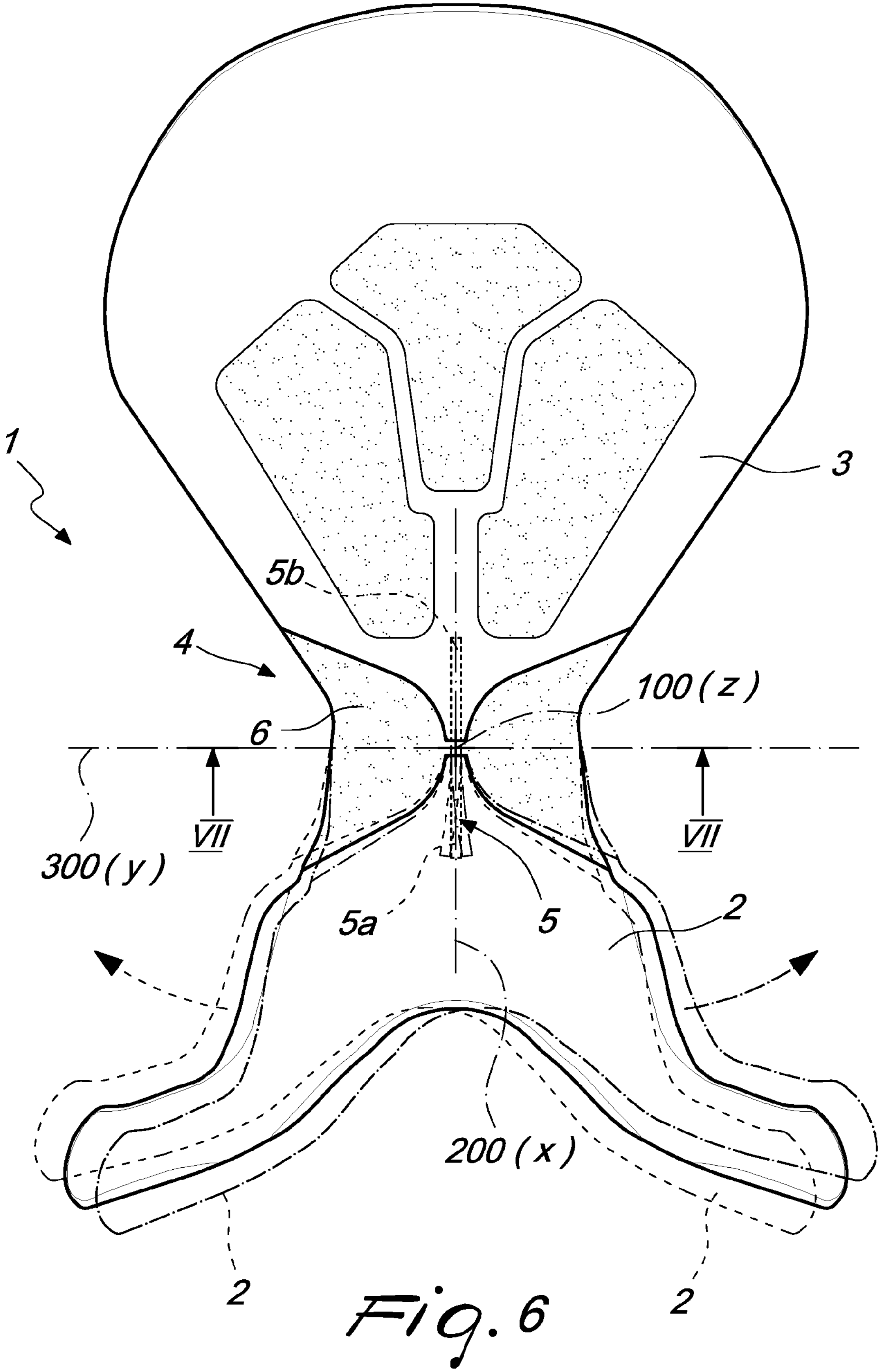
FIG. 6 is a view from above of the supporting frame showing, in dotted lines, the positions of the front part of the supporting frame as a consequence of the rotation about the pivoting axis.

With reference to the figures, the saddle for horse riding according to the disclosure comprises a supporting frame, generally designated by the reference numeral 1, associated with at least one covering body, not shown in the figures, which is designed to define a seat for the user.

According to the present disclosure, the supporting frame 1 comprises a front region 2, which defines the pommel, and a rear region 3, which defines the cantle.

According to the present disclosure, the supporting frame 1 is provided with connecting means 4 for connection between the front region 2 and the rear region 3 that are adapted to allow a rotation about an oscillation axis 100, which in use is substantially vertical, of the rear region 3 with respect to the front region 2.

In particular, the connecting means 4 are provided with at least one element 5 with elastic behavior.

The element 5 with elastic behavior is stably connected to the front region 2 and to the rear region 3.

In particular, the element 5 with elastic behavior is provided with a first engagement portion 5*a* and a second engagement portion 5*b*.

The first engagement portion 5*a* is connected to a first connecting portion 2*a* defined at the front region 2, while the second engagement portion 5*b* is connected to a second connecting portion 3*a* defined at the rear region 3.

Preferably, the first engagement portion 5*a* is stably connected to the first connecting portion 2*a* and the second engagement portion 5*b* is stably connected to the second connecting portion 3*a*.

With reference to the practical embodiment shown in FIGS. 1 to 9, the connecting means 4 comprise a flexible elongated body, which during use extends parallel to the direction of longitudinal extension 200 of the supporting structure 1.

The flexible elongated body has, conveniently, a flattened transverse cross-section.

Preferably, the flexible elongated body is associated, in use, with the front region 2 and with the rear region 3 so that its plane of arrangement lies on a plane that is substantially vertical and parallel to the direction of longitudinal extension 200 of the supporting structure 1.

In this manner, the flexible elongated body allows the controlled oscillation of the front part 2 with respect to the rear part 3 about the oscillation axis 100.

In general, the element 5 with elastic behavior comprises at least one device with predominantly elastic deformation (for example a spring) which yields if the front part 2 or the rear part 3 are subjected to a force that has a direction of application substantially perpendicular to the oscillation axis 100 and to the direction of longitudinal extension 200 of the supporting frame 1.

In practice, the supporting frame 1 extends longitudinally along a direction of longitudinal extension 200 (X axis)

which in use corresponds to the back of the horse, transversely along a direction 300 (Y axis) which is substantially parallel to the shoulders of a horse, and along the Z axis which corresponds to the oscillation axis 100 and to the gravity vector.

The element with elastic behavior is configured to allow the rotation about an oscillation axis 100.

Preferably, the oscillation axis 100 is arranged, along the direction of longitudinal extension 200, at approximately ⅓ of the way along the supporting frame 1, starting from the front part 2.

It is possible for the movement of the front part 2 with respect to the rear part 3 to also have a rotation component about the direction of longitudinal extension 200 (X axis) which is in any case of lesser extent, when compared with the possibility for rotation with respect to the oscillation axis 100.

Conveniently, the movement of the frame is allowed by a joint that extends substantially on the XY plane and allows the rotation about the oscillation axis 100 (Z axis).

The element 5 with elastic behavior can therefore have different shapes and configurations: for the purposes of example, the element with elastic behavior can likewise be constituted by a torsion spring, positioned substantially coaxially with respect to the oscillation axis 100.

Figure 10:
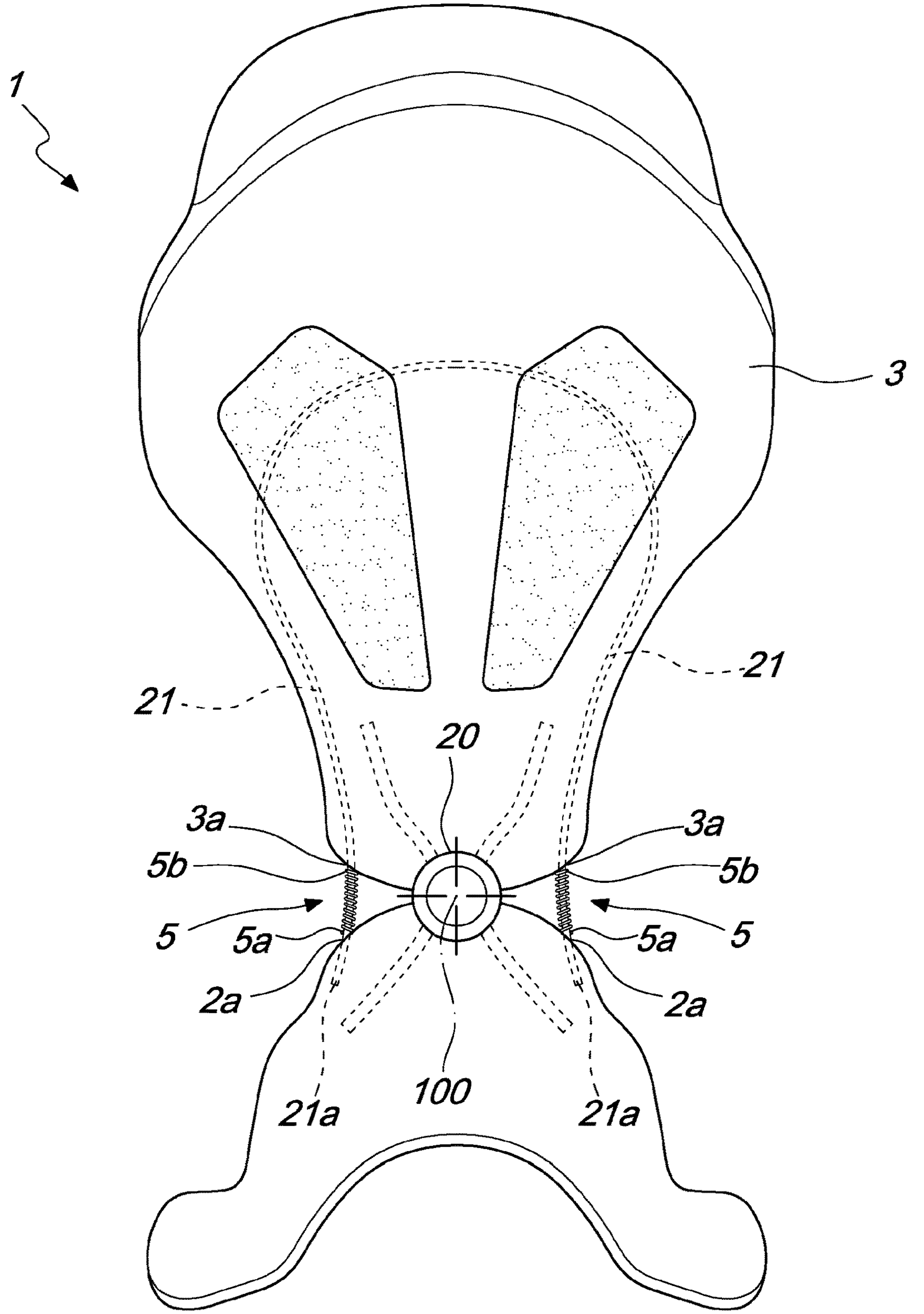
FIG. 10 is a schematic view from above of a variation of embodiment of the supporting frame.

With reference to the embodiment shown in FIG. 10, between the front region 2 and the rear region 3 there can be a hinging body 20 which is configured to allow the mutual rotation between the front region 2 and the rear region 3 about the oscillation axis 100, and an elongated connecting body 21 which is U-shaped and coupled, at its free ends 21*a*, to the front region 2.

The elongated connecting body 21 is associated, on opposite sides with respect to the hinging body 20, with respective springs that define respective elements 5 with elastic behavior.

The relative rotation of the front region 2 with respect to the rear region 3 about the oscillation axis 100 causes the lengthening of one of the two springs and the compression of the other, so that the springs themselves, once the stress has ended, tend to act in contrast to the rotation in order to return the front region 2 and the rear region 3 into alignment with respect to the direction of longitudinal extension.

Figure 11:
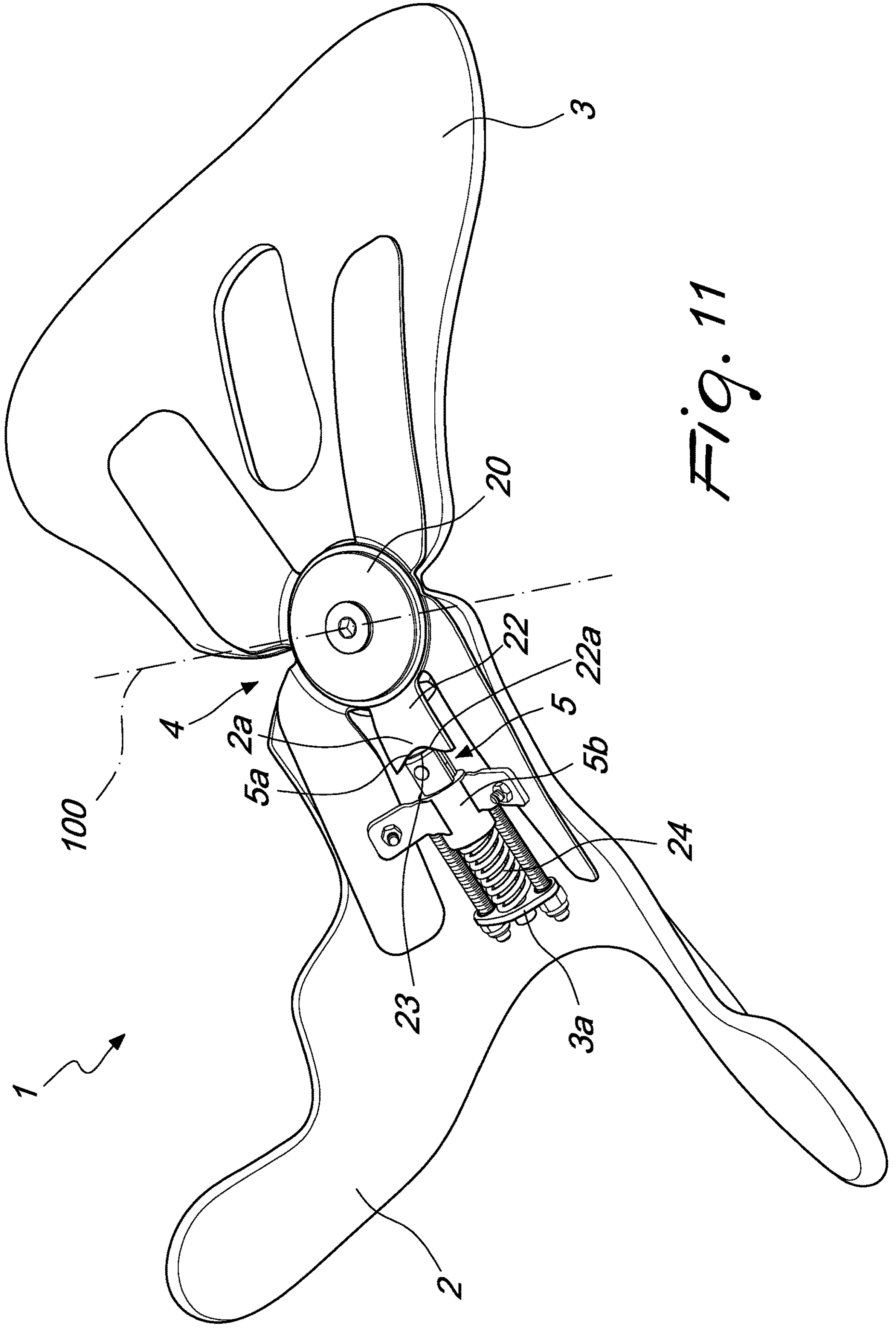
FIGS. 11 to 13 are perspective views, from below, of respective variations of embodiment of the supporting frame.

With reference to the variation of embodiment shown in FIG. 11, the portion of the hinging body 20 that is integral with the rear region 3 is associated with an appendage 22 that defines a coupling surface 22*a* with a curvilinear extension which can be engaged by an engagement head 23 which is pressed against the coupling surface 22*a* by virtue of the action exerted by a spring 24 which is carried by the first zone 2 and defines the element 5 with elastic behavior.

Preferably, the supporting frame 1 is provided with lateral bodies for connection between the front region 2 and the rear region 3, which are adapted to control the relative rotation about the oscillation axis 100 and to exert an elastic return force in order to facilitate the realignment of the front region 2 with the rear region 3 along the longitudinal direction 200.

Conveniently, the supporting frame has at least one elastic connecting membrane 6 between the front region 2 and the rear region 3 which defines the lateral bodies for connection.

In particular, the elastic connecting membrane 6 is designed to define, in cooperation with the front region 2 and with the rear region 3, the upper resting surface of the supporting frame 1.

According to a possible practical embodiment, for example illustrated in FIGS. 1 to 6, the elastic connecting membrane 6 is arranged around the connecting means 4.

It is also possible for the element 5 with elastic behavior to be supported by respective plates connected to the front region 2 and to the rear region 3.

It is also possible for the connecting means 4, and in particular the element 5 with elastic behavior, to be removably connected to the first connecting portion 2*a* and to the second connecting portion 3*a*.

In such case, it is advisable that the elastic connecting membrane 6 is not molded at and proximate to the element 5 with elastic behavior.

For the purposes of example, it is possible for the removable connection between the element 5 with elastic behavior and the first and the second connecting portion 2*a*, 3*a* to be carried out using threaded elements 9, such as for example screws and bolts, self-threading screws, breakstem rivets, clinches, designed to pass through respective through openings defined at the elastic connecting element 5 and at the first and, correspondingly, the second engagement portion 2*a*, 3*a*.

Figure 7:
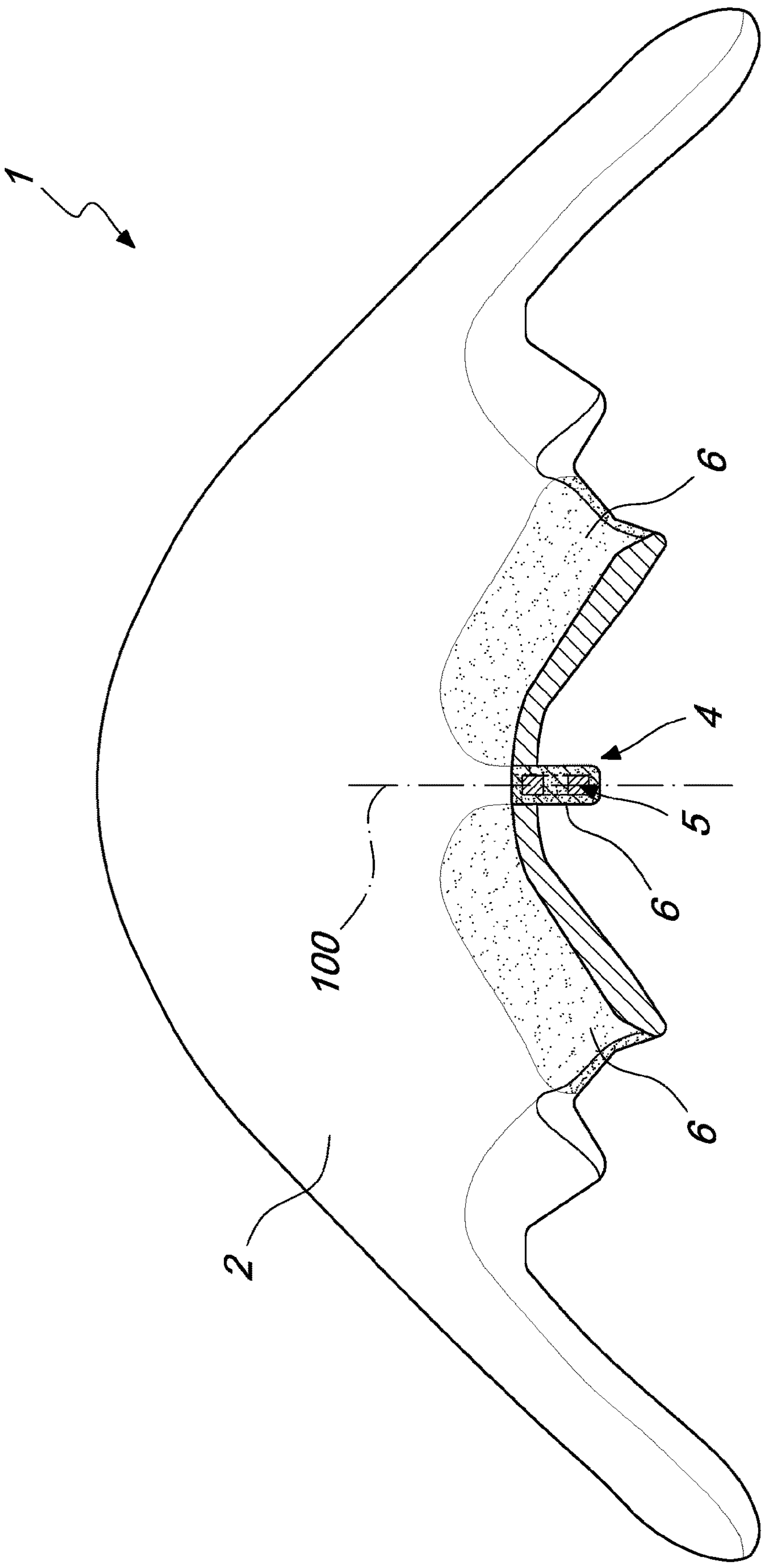
FIG. 7 is a cross-sectional view of the supporting frame taken along the plane of arrangement identified by the line VII-VII of FIG. 6.
Figure 8:
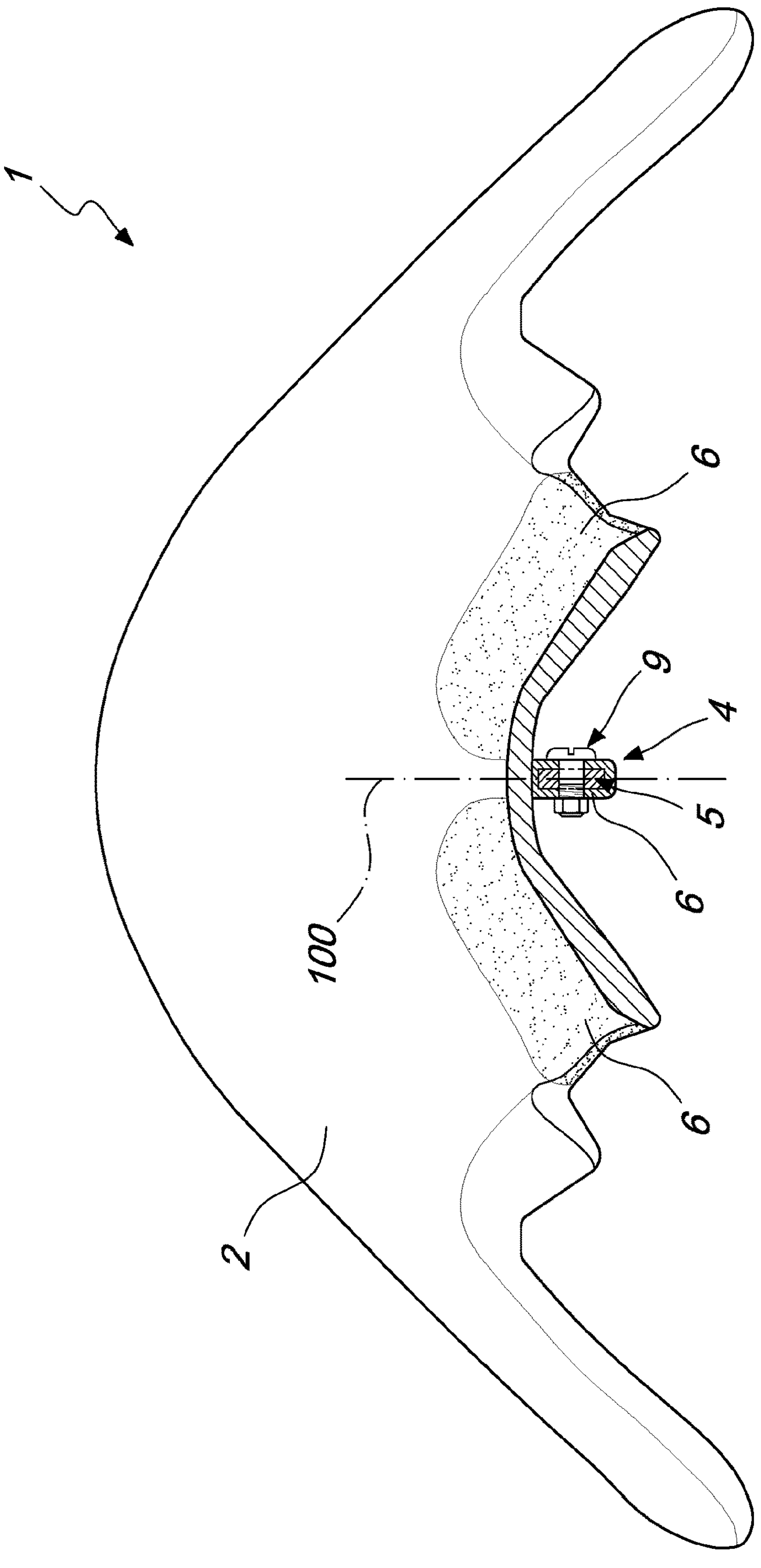
FIG. 8 shows, in the same cross-sectional view of FIG. 7, a variation of embodiment.

The elastic connecting membrane 6 is provided by molding and, as shown in FIG. 7, can embed the connecting means 4, and in particular the element 5 with elastic behavior.

Advantageously, the elastic membrane 6 is made of SEBS thermoplastic rubber.

According to a preferred practical embodiment, the front region 2 and the rear region 3 are made of fiberglass-charged nylon.

It is possible for the element 5 with elastic behavior to be made of:

- harmonic steel;
- POM (Acetron, Delrin, Fulton, Latan, Lupital, Plaslube, Tenac, Thermocomp, Ultraform);
- Epoxy resin (Araldite, Epikote, Epolite, Fiberite, Lytex, Stycast);
- ABS (Comalloy, Cycolac, Lastilac, Lupos, Lustran ABS, Magnum, Multibase, Novodur, Polyfabs, Polylac, Porene, Ronfalin, Sinkral, Terluran, Toyolac, Tufrex, Ultrastyr);
- Polycarbonate;
- PEEK;
- PET;
- PMMA;
- Polystyrene;
- Thermoplastic polyurethane (tpPUR);
- Thermoplastic PVC (tpPVC).

Figure 12:
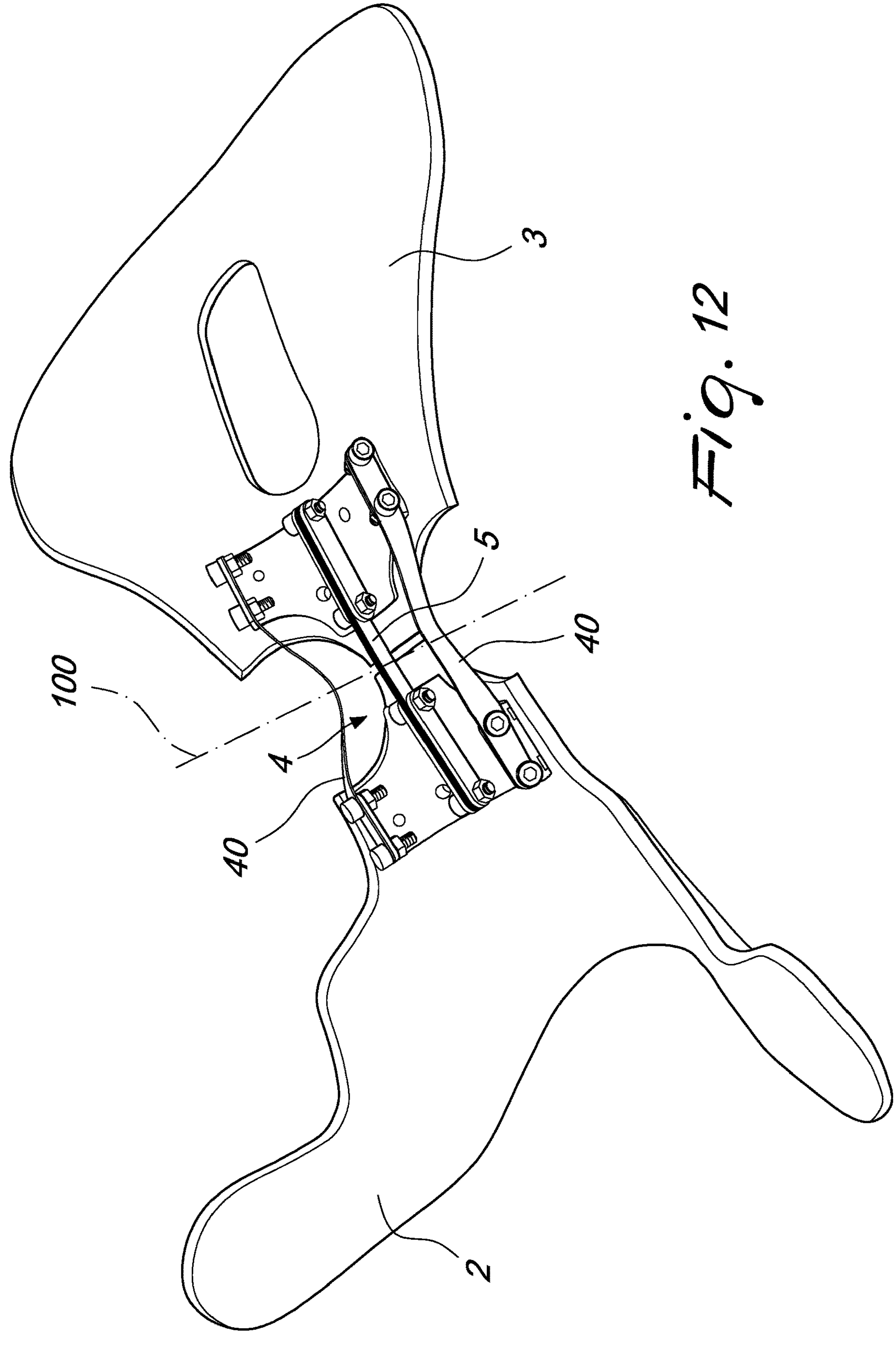
Figure 13:
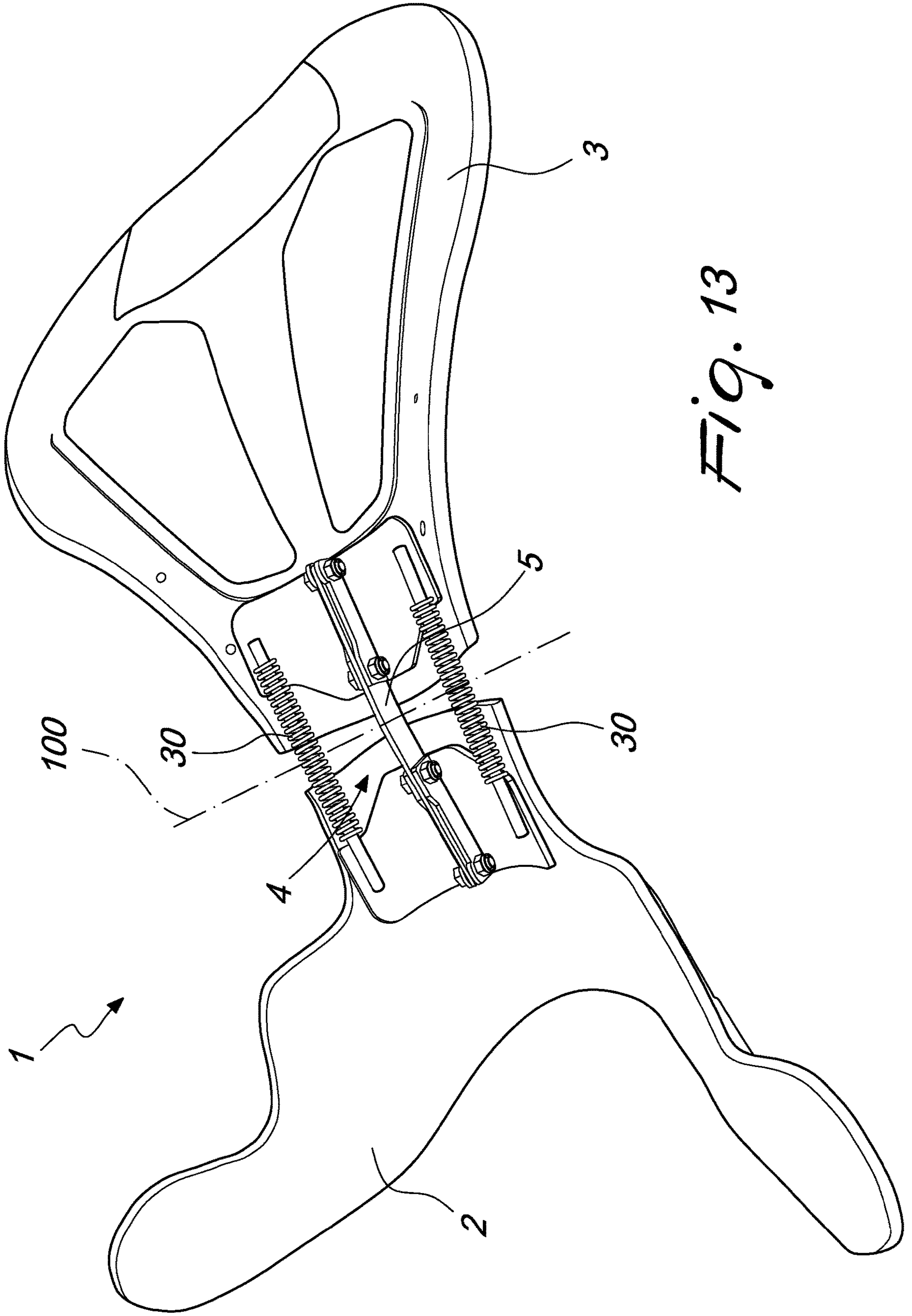

With reference to the embodiments shown in FIGS. 12 and 13, the lateral bodies for connection can comprise alternatively, or in some cases in addition, to the elastic membrane 6, lateral bodies for return 30, 40 which are designed to balance the structure and to return the front region 2 and the rear region 3 into alignment along the direction of longitudinal extension 200.

The lateral bodies for return can comprise traction springs or compression springs supported by respective plates connected to the front region 2 and to the rear region 3, or mutually opposite flat springs 40, also connected a respective plates.

With reference to the embodiment shown in FIGS. 1 to 9, the element 5 with elastic behavior has through openings for stably locking the first and the second connecting portion 2*a*, 3*a* in place.

Figure 9:
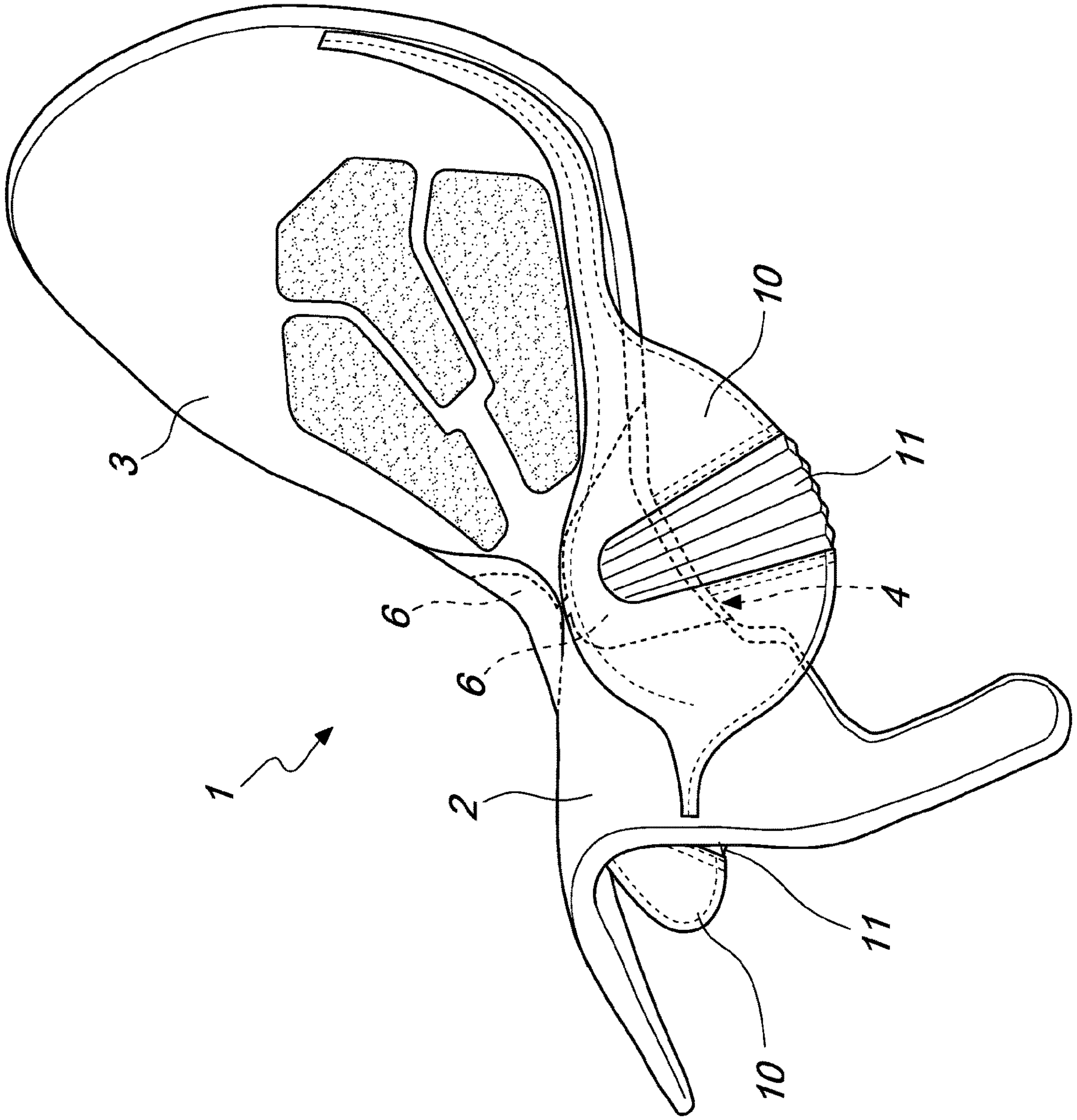
FIG. 9 shows a frame associated with a flap.

With reference to the embodiment shown in FIG. 9, it is possible for the supporting frame 1 to be associated, at each side, with a respective flap 10.

The flap 10 has, at a region that is designed, in use, to overlap at least partially the element 5 with elastic behavior, and in particular the elastic membrane 6, a deformable portion 11.

Conveniently, the deformable portion 11 is configured to support the rotation about the oscillation axis 100 of the rear region 3 with respect to the front region 2 of the supporting frame 1.

Preferably, the deformable portion 11 comprises at least one element with an accordion-like shape structure.

Use of the saddle for horse riding, according to the disclosure, is evident from the foregoing description.

In particular, it has been found that the frame 1 according to the disclosure, by virtue of the presence of the connecting means 4 which comprise at least one element 5 with elastic behavior acting between the front region 2 and the rear region 3, makes it possible to support the rotation of the region of the back of the horse, in so doing achieving a perceptible improvement in the freedom of movement of the animal.

In practice it has been found that the disclosure fully achieves the intended aim and advantages by providing a saddle for horse riding that allows a controlled rotation of the axis corresponding to the gravity vector (oscillation axis 100) of the rear region with respect to the front region.

The disclosure thus conceived is susceptible of numerous modifications and variations, all of which are within the scope of the appended claims. Moreover, all the details may be substituted by other, technically equivalent elements.

In practice the materials employed, provided they are compatible with the specific use, and the contingent dimensions and shapes, may be any according to requirements and to the state of the art.

The disclosures in Italian Patent Applications No. 102020000006154 and No. 102020000019090 from which this application claims priority are incorporated herein by reference.

The invention claimed is:

1. A saddle for horse riding comprising:

a supporting frame associated with at least one covering body designed to define a seat for a user, wherein said supporting frame has a front region, which comprises a pommel, and a rear region, which comprises a cantle, said supporting frame being provided with connecting means configured for connection between said front region and said rear region that are adapted to allow a rotation about an oscillation axis, which in use is substantially vertical, of said rear region with respect to said front region, wherein said connecting means have at least one element with elastic behavior which has a first engagement portion and a second engagement portion, said first engagement portion being connected to a first connecting portion defined at said front region, said second engagement portion being connected to a second connecting portion defined at said rear region, wherein said at least one element with elastic behavior is detachably connected to said first connecting portion and/or to said second connecting portion, wherein said supporting frame further has at least one elastic connecting membrane for connection between said front region and said rear region, said elastic connecting membrane being designed to define, in cooperation with said front region and with said rear region, an upper resting surface of said supporting frame, said elastic connecting membrane being arranged around said connecting means, said elastic connecting membrane extending partially over said front region and said rear region to define said upper resting surface in cooperation with said front and rear regions.

2. The saddle for horse riding according to claim 1, wherein said connecting means comprise a flexible elongated body, which during use extends in parallel to a direction of longitudinal extension of said supporting frame.

3. The saddle for horse riding according to claim 2, wherein said flexible elongated body has a flattened transverse cross-section.

4. The saddle for horse riding according to claim 2, wherein said flexible elongated body is associated with said front region and with said rear region so that a plane of arrangement of said flexible elongated body lies on a plane that is substantially vertical and parallel to the direction of longitudinal extension of said supporting frame.

5. The saddle for horse riding according to claim 2, wherein said element with elastic behavior comprises at least one spring device which is elastically flexible if subjected to a force having a direction of application that is substantially perpendicular to said oscillation axis and to the direction of longitudinal extension of said supporting frame.

6. The saddle for horse riding according to claim 1, wherein said elastic connecting membrane is provided by molding.

7. The saddle for horse riding according to claim 1, wherein said elastic membrane is made of SEBS.

* * * * *